United States Patent [19]

Magnollay

[11] 4,128,368
[45] Dec. 5, 1978

[54] APPARATUS FOR INSULATING AND TREATING ELECTRICAL CONDUCTORS

[75] Inventor: Gilbert Magnollay, Romanel, Switzerland

[73] Assignee: Maillefer S.A., Ecublens, Switzerland

[21] Appl. No.: 841,464

[22] Filed: Oct. 12, 1977

Related U.S. Application Data

[63] Continuation of Ser. No. 667,343, Mar. 16, 1976, abandoned.

[51] Int. Cl.² .................... B29F 3/10; B29D 23/05
[52] U.S. Cl. ............................... 425/113; 425/190
[58] Field of Search ............ 425/186, 190, 113, 376 R

[56] References Cited

U.S. PATENT DOCUMENTS

| 2,543,679 | 2/1951 | Van Riper | 425/186 X |
| 2,737,685 | 3/1956 | Fitler | 425/186 |
| 3,752,614 | 8/1973 | Bremer | 425/113 |

*Primary Examiner*—Richard B. Lazarus
*Attorney, Agent, or Firm*—Stevens, Davis, Miller & Mosher

[57] ABSTRACT

This document discloses apparatus for applying an insulating jacket to an advancing electrical conductor and includes a tubular enclosure for suspending said jacketed conductor in the presence of a treatment agent. The enclosure includes a stationary chamber and a telescoping tube to allow opening and closing of the upstream end of it. The telescoping tube is pressed axially against a pivotally supported extruder head.

5 Claims, 5 Drawing Figures

APPARATUS FOR INSULATING AND TREATING ELECTRICAL CONDUCTORS

This is a continuation of application Ser. No. 667,343 filed Mar. 16, 1976, and now abandoned.

This invention relates to apparatus for extruding an insulating jacket onto an advancing electrical conductor and for treating the jacket, which apparatus comprises an extruder having a head for applying the jacket to the conductor and a tubular enclosure for suspending the jacketed conductor in the presence of a treatment agent, the enclosure comprising stationary chamber and a telescoping tube adapted to allow opening and closing of the upstream end of the enclosure.

Apparatus of this kind are used in the manufacture of insulated conductors of relatively large diameter, especially large-diameter cables used for electric power-transmission installations. Such treatment apparatus generally utilizes a catenary arrangement. The enclosure is placed in an inclined position, and the conductor which passes through it from one end to the other is suspended between two supports, one situated at the entrance of the enclosure and the other at its exit. Thus the conductor assumes the shape of a catenary curve within the enclosure. The treatment agent is usually steam under a pressure of a few atmospheres, occupying the upper half of the enclosure, while the lower half is filled with cold water acting as a coolant.

In order to start up such an installation, an auxiliary wire is first inserted into the enclosure, then attached to the end of the cable as it leaves the upstream support, which is generally the heat of an extruder. The auxiliary wire serves to support and guide the end of the cable until it arrives at the downstream end of the enclosure. In order to insert this wire and attach it to the cable, access must be had to the inside of the enclosure. For this purpose, the enclosure generally has at its upstream end a telescopic portion which slides into the stationary chamber and which is supported and manipulated by jacks disposed on each side of the enclosure and acting in the direction of its longitudinal axis.

Rather strict requirements must be observed for starting up installations of this kind and for maintaining their operating conditions. Such operating conditions as ensure optimum treatment of the insulating jacket with which the conductor is coated must indeed be continuously maintained. Moreover, the cable should be treated in such a way that it is usable starting right from its forward end, for the cost price per running meter of some large-diameter cables is very high; and as the installation may be forty or fifty meters long, it cannot be efficiently operated if a section of cable of that length is lost every time the installation is started up.

It has now been found that several of the difficulties hitherto encountered in arriving at favorable operating conditions can be eliminated by arranging the telescoping tube in a different way from that which has been customary in the past.

It is an object of this invention to provide apparatus of the kind initially described which is easier to start up and to regulate than the prior art installations, and which ensures better operating conditions.

To this end, the apparatus according to the present invention further comprises a frame to which both the stationary chamber and the extruder head are rigidly secured, the telescoping tube being engaged about the downstream end of the chamber and pressing axially against the extruder head.

A preferred embodiment of the invention will now be described in detail with reference to the accompanying drawings, in which.

Figure 1:
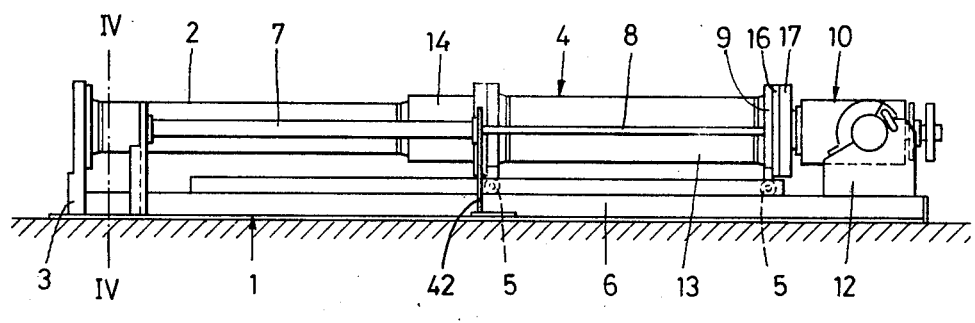
FIG. 1 is a small-scale elevation of the upstream portion of the apparatus.
Figure 2:
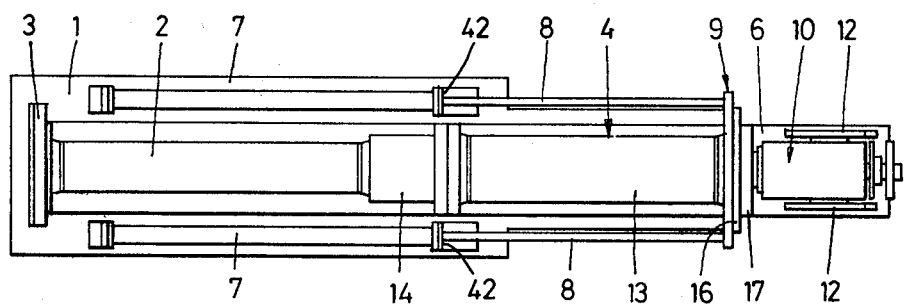
FIG. 2 is a top plan view of the portion shown in FIG. 1.

Although the apparatus is shown in the drawings as being disposed horizontally, when it is installed for operation it will actually be mounted in such a way that the longitudinal axis of the enclosure slants downward from upstream to downstream. The main elements of the installation to be described below are shown in FIGS. 1 and 2. The enclosure as a whole is supported by a rigid frame 1 which bears, for one thing, the stationary chamber of the enclosure. The upstream portion 2 of this stationary chamber, shown in FIG. 1, is fastened to the frame 1 by a support plate 3. A telescoping portion 4 is borne by two pairs of rollers 5 which run on a section 6 constituting a reinforcement of the frame 1. The telescoping portion 4 is manipulated by two jacks 7 secured to opposite sides of the portion 2, rods 8 of the jacks 7 being fastened to upstream flanges 9 of the telescoping portion 4. At its upstream end, the frame 1 bears an extruder head 10 through which passes the conductor to be insulated. The extruder head 10 is fed by the cylinder of an extruder 11, the end of which is visible in FIG. 5. Two upright plates 12 support the head 10 and secure it to the frame 1. They are arranged in such a way that the position of the head 10 can be tilted about an axis which is perpendicular to the longitudinal axis of the apparatus and which coincides with the long axis of the extruder 11 see parts 12a in FIG. 5.

Figure 3:
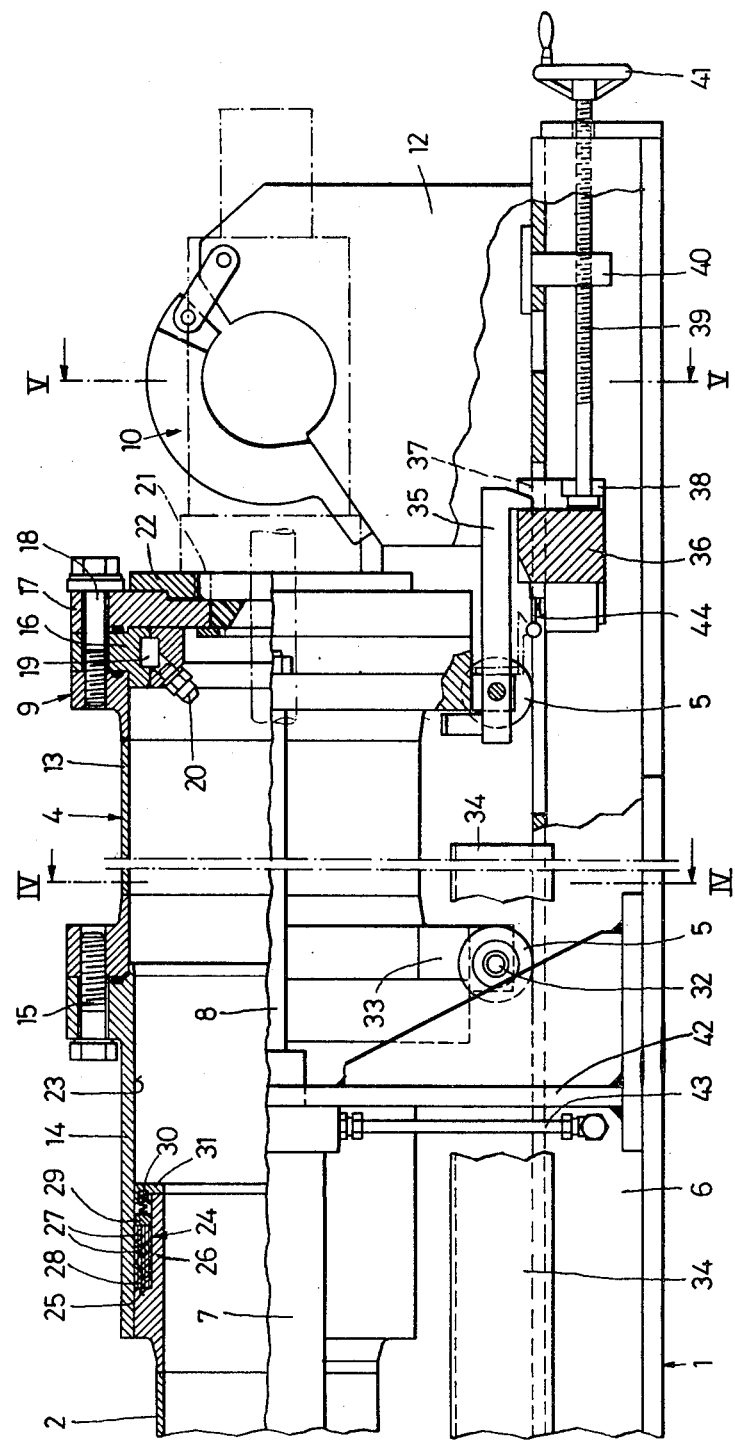
FIG. 3 is a longitudinal section on a larger scale through the elements shown in the right-hand or upstream part of FIG. 1.

FIG. 3 shows in greater detail the arrangement of the telescoping portion 4, its gasket 24, and the extruder head 10. The portion 4 comprises a tube 13 of standard construction provided with two end flanges, a coupling 14 secured by stud-bolts 15 to the upstream flange of the tube 13, as well as an injector-ring 16 and an annular plate 17 for connection to the head 10, the ring 16 and the plate 17 being secured by stud-bolts 18 to the upstream flange of the tube 13. The injector-ring 16 is composed of two coaxial annular parts welded to one another in such a way as to define between them a channel 19 which can be connected to a water supply. The inner part of the ring 16 has a series of slanting, threaded orifices opening into the annular channel 19, into which orifices injectors 20 are screwed. The inside diameter of the annular connection plate 17 is such that its inner edge comes to rest against the flat front face of the extruder head 10, which has a centering cylindrical bearing surface 21 joined to its front face at the periphery. A collar 22 secured to the plate 17 engages on the bearing surface 21. Thus, when the telescoping portion 4 is moved parallel to the longitudinal axis of the enclosure by means of the jacks 7, the collar 22 engages on the bearing surface 21, and the annular plate 17 presses against the front face of the extruder head 10, which closes off the treatment enclosure at its upstream end. A device to be described below makes it possible to lock the telescoping portion 4 in its working position so as to make it integral with the head 10.

The coupling 14 is a tubular part, the diameter of the inner surface 23 of which is slightly less than that of the tube 13. The surface 23 is precision-machined to cooperate with the gasket 24 surrounding the upstream end of the portion 2. As may be seen in FIG. 3, this upstream end of the portion 2 comprises a cylindrical flange, the outer face of which includes a shoulder 25 and a cylindrical bearing surface 26. A series of sealing rings 27, made of an elastomer or of rubber and having a V-shaped profile, are engaged on the bearing surface 26 and pressed against a support element 28, which is rectangular in profile but has a V-shaped groove in its upstream face and which is in turn pressed against the shoulder 25. A ring 29 presses the sealing rings 27 against the shoulder 25; it is acted upon by a series of spiral springs 30 seated in recesses in a locking plate 31 secured to the upstream end of the portion 2. The inner surface 23 of the coupling 14 will naturally be precisely fitted to the outside diameter of the shoulder 25. The compression exerted on the sealing rings 27 will cause them to dilate radially and will press them against the surface 23, thus ensuring that the joint between the telescoping portion 4 and the chamber portion 2 will be fluid-tight when the apparatus is in operation.

To bring the telescoping portion 4 into the open position, it suffices to operate the jacks 7. The tube 13 is borne by the rollers 5, which then run on the reinforcement section 6. The latter is a U-shaped section secured to the frame plate 1. Hence the portion 4 may be moved along until the coupling 14 is completely disengaged from the gasket 24. In its position of maximum disengagement, the injector-ring 16 comes to rest against the plate 31. Thus it is possible to disengage the extruder head 10 completely. As may be seen in FIG. 4, the rollers 5 are borne by ball bearings on shafts 32 connected by feet 33 to the upstream and downstream flanges of the tube 13. They are guided by angles 34 secured to each side of the section 6 over the entire distance to be travelled by the rollers 5.

The telescoping portion 4 is locked in operating position by means of a hook 35 (FIGS. 3 and 5) hinged to a foot (not shown) secured to the front flange of the tube 13 between the two support feet 33 of the rollers 5. The hook 35 cooperates with a locking stud 36 having parallel grooves 37 in its sides, which stud is engaged in an elongated opening in the center of the section 6. The two grooves 37 engage the edges of the elongated opening, and in the front part of the stud 36 is a slot, the lower part of which has two edge portions 38 which seize the head of a threaded rod 39 serving to control the stud 36. The rod 39 passes through a fixed nut 40 (FIG. 3), integral with the section 6, and is equipped with an operating hand-wheel 41 at its upstream end. It will be seen that the hand-wheel 41 enables the stud 36 to be moved longitudinally and, consequently, to be positioned in such a way that the hook 35 engages its front face when the telescoping portion 4 is advanced in order to close the apparatus. After engagement of the hook 35, the hand-wheel 41 may also be used to pull the plate 17 tight against the bearing surface 21, making these two parts integral.

A circuit closer 44 is actuated upon arrival of the telescoping portion 4 at the closed position. It causes the steam intake of the apparatus to be opened up. One of the elements of the circuit closer 44 is mounted on the telescoping portion 4 and the other on the stud 36.

Figure 5:
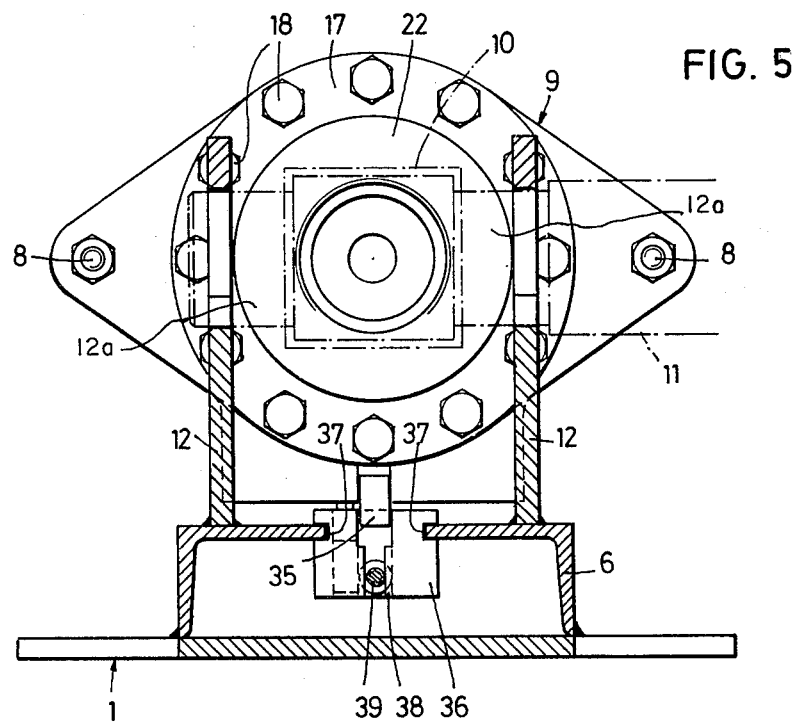
FIG. 5 is a section taken on the line V—V of FIG. 3.

Also shown in FIG. 5 is the auxiliary transverse shaft 12a borne by the two plates 12. The shaft 12a supports the extruder head for free pivotal movement in response to thrust supplied from the plate 22 of the tube 4. While the shaft 12a plays no part in the operation of the telescoping portion 4, the free pivotal movement of the head 10 permits the collar 22 of telescoping portion 4 to bear against the surface 21 in a flat sealing relationship.

Figure 4:
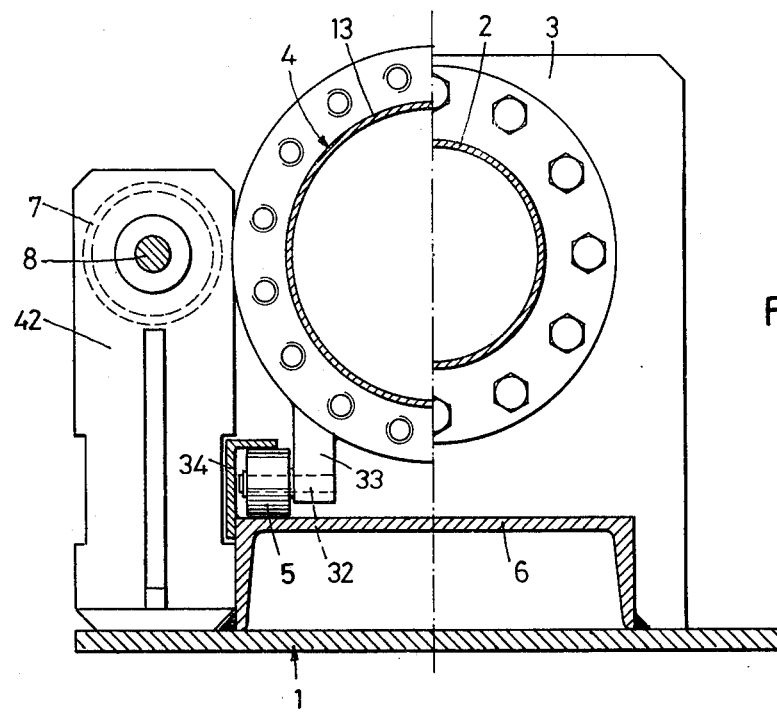
FIG. 4 is a vertical cross-section taken on the line IV—IV of FIG. 1 for the left-hand side and on the line IV—IV of FIG. 3 for the right-hand side.

Lateral supports 42, consisting of blanked plates and of stiffeners welded to the frame 1, are also shown in the drawings (FIGS. 3 and 4). The supports 42 serve to secure the jacks 7, which are supplied by pipes 43 enabling the operation of telescoping portion 4 to be controlled. The downstream portion of the stationary chamber, arranged in a conventional manner, is not shown in the drawing. It is made up of tubular elements, such as the element 2, joined end to end. These elements are provided with the necessary connections for filling the enclosure, measurement and regulation of the pressure, etc.

The arrangement described above presents numerous advantages:

(a) As the extruder head 10 is integral with the frame 1, and as its front face constitutes part of the enclosure put under pressure when the apparatus is in operation, the forces resulting from the pressure prevailing within the enclosure and acting upon the annular parts 16 and 17 of the telescoping portion 4 are also decreased owing to the large size of the entry opening of the enclosure. There is no necessity of providing braces or supports to withstand these forces, for the telescoping portion can rest directly against the extruder head. This ensures better fluid-tightness between the extruder head and the enclosure while at the same time avoiding fitting difficulties and the risk of distortion due to dilation during the course of operation. When the extruder head is integral with the frame of the extruder, but the enclosure with its telescoping tube is mounted on a separate frame, such risks are disturbing.

(b) The length of the surface 23 cooperating with the gasket 24 need not necessarily be equal to that of the telescoping tube. Since the latter is borne by the rollers 5, it can be moved over a much greater length than that of the surface 23, so that the costs of machining this surface are reduced. Moreover, since the surface 23 is positioned towards the inside of the telescoping tube, it runs no risk of untimely damage, and this helps to preserve the gasket. Owing to quality of this surface, its good preservation, and its short length, there is very little wear on the sealing rings of the gasket.

(c) There is easy access to the sealing rings of the gasket, for the nuts which hold the stud-bolts 15 can be removed so that the coupling 14 may be disengaged from the rest of the portion 4 and withdrawn towards the downstream end of the portion 2. The gasket 24 is then completely exposed, thus enabling the sealing rings 27 to be checked, maintained, and replaced.

(d) Since the tube 13 is larger in diameter than the portion 2, the entry opening of the enclosure, consisting of the central aperture of the plate 17, may be relatively large. This arrangement facilitates the engagement of the cable when the installation is started up, as has already been explained above.

(e) Because the extruder head is mounted to be rotatable on its support about an axis coinciding with that of the extruder, the position of the extruder head can easily be adjusted even while the apparatus is in operation.

(f) The increase in diameter of the telescoping tube as a result of its being disposed on the outside has at last made it possible to provide cold-water injectors, such as the injectors 20, for cooling the steam in contact with the extruder head. This is a much more efficient solution than the use of the cooling coils known heretofore.

(g) Finally, for the same reason as above, it is also possible to equip the extruder head with a gasket preventing the pressurized steam filling the upstream portion of the enclosure from penetrating into the head through the exit orifice for the insulated cable. This gasket may be a frusto conical element held in place in front of the extruder head by a support ring against which the telescoping tube comes to rest when acted upon by the jacks. It would also be possible to provide sealing elements mounted on the telescoping tube and pressing against the mentioned support ring.

I claim:

1. In a plant arranged for continuously applying and treating an insulating jacket on an electrical conductor advancing from an upstream end toward a downstream end through said plant, an extruder, an extruder head fed from said extruder and surrounding said conductor, an elongated stationary chamber, a tube having a common axis with said chamber, said tube being mounted for telescoping movement with respect to said chamber, an annular plate secured at an upstream end of said tube, said extruder head having a flat front face, means mounting said head for free rotation about an axis perpendicular to said common axis, means for displacing said tube to press said annular plate against said flat front face, thereby causing said face to pivot to permit parallel alignment to said flat front face with said annular plate thus to seal said head to said tube.

2. Apparatus in accordance with claim 1, further comprising rollers running on said frame and bearing said telescoping tube.

3. Apparatus in accordance with claim 1, further comprising a gasket arrangement disposed on the outer surface of said upstream end of said chamber, said telescoping tube having a cylindrical inner surface extending to its downstream end and adapted to cooperate with said gasket arrangement.

4. In a plant according to claim 3, said outer surface comprising a cylindrical bearing surface (26) and said gasket arrangement further comprising a shoulder (25) extending at one end of said bearing surface, a number of annular sealing rings (27) of a deformable material engaging said bearing surface, a rigid annular member (29) also engaging said bearing surface opposite said shoulder and springs (30) arranged for biasing said annular member towards said shoulder, thus pressing said sealing rings between said shoulder and said rigid annular member.

5. In a plant according to claim 1, a locking device between the telescoping tube and the frame, for holding said annular plate pressed against said head flat front face.

* * * * *